Patented Aug. 28, 1945

2,383,921

UNITED STATES PATENT OFFICE 2,383,921

METHOD FOR PURIFYING RING SUBSTITUTED METHYL STYRENE

Frank J. Soday, Swarthmore, Pa., assignor to The United Gas Improvement Company, a corporation of Pennsylvania No Drawing. Application January 30, 1942, Serial No. 428,832

16 Claims. (Cl. 260—669)

This invention is concerned generally with the depolymerization of ring substituted methyl styrene polymers.

More specifically, this invention pertains to the depolymerization of ring substituted methyl styrene polymers, or mixtures thereof, dissolved or dispersed in a polymerizable solvent, or mixture of polymerizable solvents.

An object of the present invention is the isolation of one or more monomeric ring substituted methyl styrenes, in the form of a mixture with a polymerizable solvent, from a methyl styrene fraction or solution by a process comprising subjecting said fraction or solution to polymerization conditions, substituting a polymerizable solvent or mixture of polymerizable solvents for the unpolymerized material present, followed by depolymerizing such as by the application of heat the ring substituted methyl styrene polymers which may be in various forms such as homopolymers of any one or more of the ring substituted methyl styrenes, or copolymers of the isomeric ring substituted methyl styrenes, or mixtures thereof.

Another object of the invention is the isolation of one or more monomeric ring substituted methyl styrenes, in the form of a mixture with a polymerizable solvent or solvents, from the still residues commonly obtained as a by-product of the distillation and/or fractionation of fractions or solutions containing one or more ring substituted methyl styrenes by a process comprising substituting a polymerizable solvent or mixture of polymerizable solvents for the unpolymerized material present, and depolymerizing the ring substituted methyl styrene polymers such as by the application of heat.

A further object of the invention is the depolymerization of polymer or polymers obtained from one or more ring substituted methyl styrenes by the application of heat to a solution in a polymerizable solvent of said polymer or polymers when in the form of a thin layer or film.

Another object of the invention is the depolymerization of a solution in a polymerizable solvent of such polymer or polymers by the application of heat thereto when in finely divided form.

A further object of the invention is the isolation of one or more monomeric ring substituted methyl styrenes, in the form of a mixture with a polymerizable solvent, from ring substituted methyl styrene polymers in general, including scrap ring substituted methyl styrene polymers, such as, for example, the gates, sprues and other by-products obtained upon molding, casting, extruding, machining, or otherwise handling or working ring substituted methyl styrene or polymerized ring substituted methyl styrene, by a process comprising dissolving or dispersing such polymers in a polymerizable solvent, or mixture of polymerizable solvents, and depolymerizing the ring substituted methyl styrene polymers by the application of heat.

Other objects and advantages of the invention will be apparent to those skilled in the art from an inspection of the following specification and claims.

For convenience in description, specific reference to methyl styrene or methyl styrenes throughout the specification is intended to embrace the presence of one or more ring substituted styrenes such as ortho methyl styrene, meta methyl styrene, and para methyl styrene, although the presence of side chain substituted styrenes and particularly side chain substituted methyl styrenes is not precluded as will hereinafter appear.

My present invention involves the step of depolymerizing methyl styrene polymer, which may be present in the form of homopolymers of the individual methyl styrenes and/or in the form of copolymers thereof.

The fractions or solutions constituting one preferred source of my starting material may contain only one of the individual methyl styrenes or they may contain two or more of the individual methyl styrenes in admixture. Consequently, upon polymerization of such fractions or solutions the monomeric components thereof may form homopolymer of a single methyl styrene and/or a plurality of homopolymers of such individual methyl styrenes as may be present, and/or copolymer or copolymers of the methyl styrenes where two or more are present.

The extent to which one or more homopolymers and/or copolymers of methyl styrene are formed in any given case may depend upon a number of factors at present not entirely understood, such as the ratio of monomeric material present in the fraction or solution (or the ratio to each other of the several monomeric constituents when more than one are present), the nature and quantity of impurities present, the polymerizing conditions such as temperature, type of catalyst, if any, etc., and perhaps other factors.

A "homopolymer" may be said to be a polymerization product resulting from the combination of molecules of monomer and/or polymers of the same monomeric polymerizable compound.

A "copolymer," on the other hand, may be defined as a polymerization product resulting from the combination of molecules of monomers and/or polymers of at least two different monomeric polymerizable compounds.

For convenience in the specification and claims, I employ the term "methyl styrene polymer" and its variants, unless otherwise qualified by the context, to embrace homopolymers of any one or more ring substituted methyl styrenes and/or ring substituted methyl styrene copolymer in any combination such as may result from the polymerization of one or more ring substituted methyl styrenes.

In the various processes which have been developed for the manufacture of artificial gas, such as oil gas, carburetted water gas, or coal gas, considerable quantities of tar are produced, and the gas contains substantial quantities of other readily condensible materials.

The condensate obtained from the artificial gas, as well as the light oil obtained upon distillation of the tar, constitute sources for many unsaturated and aromatic hydrocarbons. The light oil obtained from the pyrolysis of petroleum or of petroleum hydrocarbons is especially rich in unsaturated hydrocarbons, particularly when temperatures in excess of 1100° F. have been employed in the cracking operations.

Among these unsaturated hydrocarbons are the following methyl styrenes,

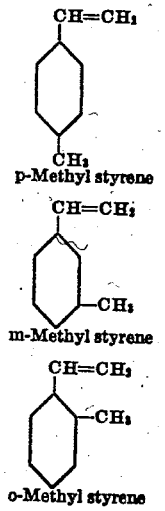

Although the light oil from which the methyl styrenes may be isolated has been available in commercial quantities for several decades, until recently no satisfactory processes have been developed for the utilization of these materials sufficiently promising to warrant commercial exploitation. The so-called crude light naphtha in which they occur has been used generally for production of resins of inferior quality and dark color, as a cut-back for tar or asphalt, or for fuel purposes.

I have discovered that the methyl styrenes present in methyl styrene fractions or solutions may be isolated, in the form of a solution in a polymerizable solvent, by the polymerization of the said fraction or solution, substituting a polymerizable solvent or mixture of polymerizable solvents for the unpolymerized material present, and depolymerizing the methyl styrene polymers contained in the resulting mixture by the application of elevated temperatures, and preferably while the mixture is in attenuated form.

As polymerizable solvents, I prefer to employ materials containing at least one double bond and capable of being polymerized by the application of heat and/or catalysts. As examples of such polymerizable solvents, I may employ styrene; substituted styrenes, including alkyl, aryl, alkyl-aryl, aryl-alkyl, halogen, and/or other substituted styrenes, such as for example, o-methyl styrene, m-methyl styrene, and/or p-methyl styrene; olefines in general, whether substituted or not, such as isobutylene, vinyl naphthalene, and vinyl carbazole; diolefines, whether substituted or not, such as, for example, butadiene, isoprene, piperylene, cyclopentadiene, 2-chloro-butadiene-1, 3, and the like; acrylic acid, derivatives of acrylic acid and/or substituted acrylic acids such as, for example, methyl acrylate, acrylic nitrile, and the like; methacrylic acid, derivatives of methacrylic acid and/or substituted methacrylic acids, such as, for example, methyl methacrylate, ethyl methacrylate, and the like; substituted vinyl derivatives, such as, for example, vinyl chloride, vinyl acetate, and the like; vinylidene derivatives, such as, for example, vinylidene chloride; maleic anhydride and derivatives and substituents thereof; other compounds containing at least one polymerizable double bond; and mixtures containing two or more of the foregoing.

In general, the foregoing compounds may be represented by the following structural formula

in which $a$, $b$, $c$, and $d$ are selected from the class consisting of the following: hydrogen, alkyl; unsaturated alkyl; substituted alkyl; unsaturated substituted alkyl; aryl; substituted aryl; unsaturated aryl; unsaturated substituted aryl; alkyl-aryl; substituted alkyl-aryl; unsaturated alkyl-aryl; substituted unsaturated alkyl-aryl; aryl-alkyl; substituted unsaturated aryl-alkyl; hydrocarbon groups, residues, and radicals in general, whether substituted and/or unsaturated or not, such as naphthenic, superaromatic, heterocyclic, and other groups; —COOH; —COOR$_1$, where R$_1$ may be alkyl, aryl, aryl-alkyl, alkyl-aryl, hydrocarbon groups, residues, and radicals in general, whether substituted and/or unsaturated or not; —CN; —Cl; —Br; —F; —I; —HSO$_4$; —OH; —OR$_1$, where R$_1$ may be alkyl, aryl, aryl-alkyl, alkyl-aryl, hydrocarbon groups, residues, and radicals in general, whether substituted and/or unsaturated or not; —COCl; and the like.

Due consideration must be given to the solubility of the methyl styrene polymers in different types of polymerizable solvents in selecting a polymerizable solvent, or mixture of polymerizable solvents, for this purpose. Thus, for example, a polymerizable solvent containing one or more aromatic rings usually will be found to dissolve methyl styrene polymers readily.

A preferred embodiment of this invention is the use of monomeric styrene and/or monomeric substituted styrenes corresponding to the following general formula

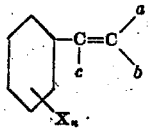

where $a$, $b$, and $c$ are selected from the class consisting of hydrogen; alkyl; aryl; alkyl-aryl; and aryl-alkyl groups; whether substituted or not; alkene; alkene-aryl; aryl-alkene; halogen; —CN; —COOH; —COOR$_2$; —HSO$_4$; —OH; and —OR$_2$; where R$_2$ represents alkyl; aryl; alkyl-aryl; and aryl-alkyl groups, whether substituted or not, alkene; alkene-aryl; aryl-alkene; X is selected from the class consisting of alkyl; aryl; alkyl-aryl; and aryl-alkyl groups; whether substituted or not; alkene; alkene-aryl; aryl-alkene; and $n$ represents the fact that there may be none or up to five substituents on the benzene ring, as a solvent or solvents for methyl styrene polymers prior to the depolymerization thereof.

The use of styrene for this purpose gives unusually satisfactory results.

It is to be understood, of course, that the foregoing monomeric polymerizable solvents, or mixtures thereof, may contain some polymers prior to their use as solvents for methyl styrene polymers, and that some of the said monomeric materials may polymerize to some extent during the process of dissolving or dispersing the methyl styrene polymers in the polymerizable solvent or mixture of solvents, or of displacing or replacing the unpolymerized material present in a polymerized methyl styrene fraction or solution with a polymerizable solvent having a higher boiling point. Certain of these polymers may depolymerize, at least in part, to form the corresponding monomeric compounds during the subsequent depolymerizing step.

The undepolymerized portion of such polymers will, in most cases, be isolated in the residues accumulated in the depolymerizing unit, together with any undepolymerized portion of the methyl styrene polymers.

In addition, one or more saturated or unpolymerizable solvents also may be used in conjunction with a polymerizable solvent, or mixture of such solvents, as a solvent for methyl styrene polymers prior to their depolymerization. In such cases, the unpolymerizable solvent preferably has a different boiling point or range from that of methyl styrene and the polymerizable solvent or solvents present, in order that it may be readily separable therefrom, if desired. However, I generally prefer to employ polymerizable solvents only in the practice of my invention.

It may be found desirable in certain cases to incorporate a polymerization inhibitor in the polymerizable solvent prior to or during the process of dissolving the methyl styrene polymer in the polymerizable solvent, or prior to or during the depolymerization of the methyl styrene polymer dissolved in a polymerizable solvent, in order to prevent any substantial polymerization of said solvent. An example of such an inhibitor is hydroquinone. In case the added inhibitor is somewhat volatile, the mixture of monomeric methyl styrene and polymerizable solvent obtained from the process may be treated to remove any inhibitor present, if desired, such as by washing with an alkaline solution, or otherwise, if desired.

Certain non-polymerizable, relatively high-boiling volatile materials, such as plasticizers, softening agents, and the like, also may be incorporated in the solution of methyl styrene polymers in a polymerizable solvent at any stage prior to, or during the depolymerization of the methyl styrene polymers. Such materials are isolated with the mixture of methyl styrene and polymerizable solvent and may be incorporated subsequently in any polymer or copolymer prepared therefrom, if desired, by polymerizing the said mixture of methyl styrene, polymerizable solvent, and non-polymerizable relatively high-boiling volatile material.

As pointed out previously, this process is particularly well adapted to the isolation of one or more monomeric methyl styrenes, in the form of a mixture with one or more polymerizable solvents, from light oil fractions containing the same, such, for example, as the light oils obtained by the destructive distillation of carbonaceous material, such as petroleum, other oils, coal, and similar materials. The light oil obtained by the pyrolysis of petroleum at temperatures in excess of 1100° F., such as, for example, in the various processes developed for the production of oil gas or carburetted water gas from petroleum, is an especially desirable source of such methyl styrene fractions.

As a result of extensive experimentation, I have found that light oil fractions derived from oil gas and boiling within the range of approximately 160° to 178° C. contain substantial quantities of methyl styrenes. Thus, for example, the predominating unsaturated hydrocarbons present in light oil fractions boiling in the range of 165° to 175° C., and more particularly in the range of 167° to 173° C., usually are para methyl styrene and meta methyl styrene.

The process disclosed herein for the isolation of methyl styrene from light oil fractions containing the same comprises polymerizing the said fraction or solution, substituting a polymerizable solvent or mixture of polymerizable solvents for the unpolymerized material present, and depolymerizing the methyl styrene polymer solution by the application of heat.

The initial step in the isolation of methyl styrene, in the form of a mixture with one or more polymerizable solvents, from fractions or solutions containing the same, namely, the polymerization of such fractions or solutions, may be carried out in any desired manner.

Thus, for example, such fractions may be polymerized by the application of heat. In general, an increase in temperature during such polymerizing processes results in a corresponding decrease in the time required to convert the methyl styrene present to polymers and a decrease in the molecular weight of such polymers. As the low molecular weight polymers can be handled somewhat more easily in the depolymerizing processes described herein, due to their friable nature and the relative ease with which they may be dissolved in certain polymerizable solvents, a preferred embodiment of this invention is the use of such low molecular weight polymers in such processes.

Thus, for example, light oil methyl styrene fractions boiling in the range of 160° to 178° C. may be polymerized by the application of temperatures in the range of 150° to 200° C., or higher, for periods ranging from one to four days, for example, to give excellent yields of polymers which have a low molecular weight, are friable, and may be dissolved readily in certain solvents of the type described herein.

A friable polymer may be distinguished from a tough polymer in that the former cannot be readily molded without fracture whereas the latter can be very readily molded without fracture. In general a friable polymer may also be distinguished from a tough polymer in that it has a relatively low melting point, for example below 150° C. by the capillary method.

Generally speaking, however, any desired polymerizing schedule may be employed and the polymerization may be carried out at any desired pressure, whether atmospheric or above or below, and in the presence of any desired gaseous substance, such as air, nitrogen, carbon dioxide, and the like.

In addition, catalysts may be used for the polymerization of such fractions, either alone or in combination with the simultaneous, or otherwise application of heat. Examples of such catalysts are peroxides, such as, hydrogen peroxide, benzoyl peroxide, stearyl peroxide, and the like; contact materials such as clay, activated clay, carbon, activated carbon, silica gel, alumina, and the like; metallic halides and metallic halide-organic solvent complexes, and especially those which are characterized by readily hydrolyzing in the presence of water to give an acid reaction, such as aluminum chloride, boron trifluoride, aluminum chloride-diethyl ether complex, boron trifluoride-diethyl ether complex, and the like; ansolvo acids such as borofluoroacetic acid; mineral acids and mineral acid-organic solvent mixtures or reaction products, such as sulfuric acid and sulfuric acid-diethyl ether mixture; reactive metals such as sodium; and other catalysts or mixtures thereof.

After polymerization, such catalysts preferably are removed from the polymers prior to their depolymerization by the methods to be more particularly described herein. In the case of contact materials, such catalysts usually can be readily removed from the polymer solution by filtration or centrifuging. In the case of metallic halides and complexes thereof, ansolvo acids, and mineral acids, such acid-acting catalysts preferably are hydrolyzed or neutralized by the addition of an alkali or an aqueous solution of an alkali, followed by filtration or centrifuging to remove the hydrolysis products. Reactive metals may be removed by the addition of alcohol, followed by filtration.

Other methods of removing the catalysts employed in such processes may be used, if desired.

By the use of catalysts in conjunction with the use of elevated temperatures, polymers possessing almost any desired physical properties may be obtained. In addition, the complete conversion of the methyl styrene present in a given fraction to polymers may be accomplished in a minimum of time by the use of certain of the catalysts described in combination with the use of elevated temperatures.

The methyl styrene present in a given fraction or solution may be converted to polymers possessing very low melting points by the use of certain catalysts in conjunction with the application of elevated temperatures. Thus, the polymerization of a light oil methyl styrene fraction with activated clay at elevated temperatures resulted in the production of a polymer which was liquid at room temperatures. The use of such low melting or liquid polymers may be desirable in certain of the depolymerizing processes described herein, as will be more fully explained hereinafter.

By the use of rigorous polymerizing methods, dimers, trimers, and other relatively low molecular weight products may be obtained from methyl styrene fractions or solutions. The low molecular weight polymers of this type may be used in the depolymerizing processes of the type described herein.

In general, it may be said that the use of elevated temperatures for the polymerization of methyl styrene fractions is preferred.

Irrespective of the method employed in polymerizing the methyl styrene fraction or solution, the next step in the process involves the removal of the unpolymerized material present. This can be carried out in any desired manner. Thus, for example, the polymer solution may be distilled, preferably under reduced pressure and/or the application of superheated steam, until all of the unpolymerized material has been removed.

Other methods of isolating the polymer may be used, if desired. Thus, for example, the polymer may be precipitated from its solution in the unpolymerized materials present by the addition of a non-solvent for the polymer therein, such as alcohol. The precipitated polymer then may be further processed to remove unpolymerized material, if desired, such as by working it on heated rolls, or otherwise.

The polymer solution also may be processed to remove unpolymerized material, among other ways, by spray drying methods such as by spraying the polymer solution into a heated tower, either alone or in conjunction with the use of steam or an inert gas to assist in removing the unpolymerized material, by working the material on hot rolls to remove unpolymerized material, or by other methods.

It is preferred that all, or substantially all, of the unpolymerized material present in such polymer solutions be removed prior to dissolving the said polymers in a polymerizable solvent or mixture of polymerizable solvents and the depolymerization thereof. Otherwise, such unpolymerized materials may contaminate the mixture of methyl styrene and polymerizable solvent obtained from the depolymerizing process.

An entirely unexpected advantage derived from the use of the process described herein for the depolymerization of methyl styrene polymers is the removal of impurities commonly associated with any impure methyl styrene fraction employed. Thus, for example, light oil methyl styrene fractions commonly contain substantial quantities of methyl phenyl acetylene, colored compounds, and color-forming compounds, all of which must be substantially completely removed from the methyl styrene before a polymer having acceptable physical properties may be prepared therefrom.

I have discovered that such compounds are substantially completely, or completely, removed from impure methyl styrene fractions or solutions, such as light oil methyl styrene fractions, during my process described herein in most if not all cases, resulting in the production of a mixture of monomeric methyl styrene and polymerizable solvent substantially completely free from such undesirable compounds.

Polymerizable solvents having any desired boiling point or range may be used to dissolve methyl styrene polymers prior to their depolymerization. Somewhat different procedures may be employed in substituting the desired polymerizable solvent, or mixture thereof, for the unpolymerized material present in the polymerized methyl styrene fraction depending, among other things, upon the boiling point or boiling range of the polymerizable solvent or mixture of polymerizable solvents employed for this purpose.

Thus, when a polymerizable solvent having a boiling point or range substantially above that of the highest boiling methyl styrene is used, the polymerizable solvent or mixture of polymerizable solvents may be added to the polymerized methyl styrene fraction prior to the removal of the unpolymerized material therefrom, after which the unpolymerized material originally present in the methyl styrene fraction may be removed by any desired method, such a by distillation and/or fractionation, resulting in a solution of methyl styrene polymers in the desired polymerizable solvent, or mixture of polymerizable solvents.

In the case of a polymerizable solvent, or mixture of polymerizable solvents, having a boiling point or boiling range similar to, identical with, or below the boiling point of any of the methyl styrenes, the methyl styrene polymers preferably are isolated from the unpolymerized material present in the polymerized methyl styrene fraction prior to the addition thereto of such polymerizable solvents. Suitable methods for the isolation of the methyl styrene polymers have been discussed previously.

This latter method, of course, applies also to polymerizable solvents having a boiling point or range substantially above that of any of the methyl styrenes. It also applies to the preparation of solutions of methyl styrene polymer or polymers in a mixture of polymerizable solvents having boiling points both above and below that of the monomeric methyl styrenes.

What has been said with respect to the isolation of monomeric methyl styrene, in the form of a mixture with one or more polymerizable solvents, from light oil methyl styrene fractions, applies also to methyl styrene fractions or solutions in general. Thus, for example solutions of monomeric methyl styrene in other compounds, such as, for example, methyl styrene fractions or solutions obtained upon the dehydrogenation of ethyl methyl benzene, the dehydration of methyl phenylethyl alcohol, the decomposition of methyl cinnamic acid, and from other sources, may be isolated, in the form of a mixture with one or more polymerizable solvents, according to the method described herein with excellent results. However, the problem of purification is almost infinitely greater with light oil fractions due, among other things, to the presence of a wide variety of impurities in the latter fractions.

Fractions or solutions containing almost any desired proportion of one or more methyl styrenes may be used in the process described herein. Thus, fractions containing as little as 1% methyl styrene may be polymerized, a polymerizable solvent or solvents substituted for the unpolymerized material present, and the resulting solution or mixture depolymerized to form methyl styrene in admixture with polymerizable solvent. However, I generally prefer to use fractions containing somewhat larger quantities of methyl styrene, say 10% or more, for practicable reasons. Fractions or solutions containing 20% or more of methyl styrene, such as 30% to 80% or higher, are particularly desirable for this purpose.

In addition to the use of polymers prepared directly by the polymerization of fractions or solutions containing methyl styrene, methyl styrene polymers obtained from other sources also may be depolymerized by the process described herein to form a mixture of monomeric methyl styrene and one or more polymerizable solvents with excellent results.

A very satisfactory source for such polymers is the still bottoms or residues obtained as a by-product of the fractionation of solutions or fractions containing methyl styrene. Thus, for example, light oil obtained from oil gas, or from other sources, commonly is fractionated to obtain fractions containing substantial proportions of methyl styrene, among other unsaturated hydrocarbons. Such fractionating steps result in the production of considerable quantities of polymers from the methyl styrene present in such fractions, particularly when drastic fractionating methods are employed for the production of fractions containing substantial quantities of methyl styrene. The still residues obtained from such processes are particularly well adapted to the production of methyl styrene by the depolymerizing methods described herein.

As such still residues are commonly drained from the still pot or reboiler, either continuously or discontinuously, before all of the unpolymerized material has been distilled therefrom in order to assist in the removal of the still residues from the unit, such materials preferably are treated to remove all unpolymerized material present prior to dissolving the said polymers in a solvent of the type described herein and the depolymerization of the methyl styrene polymers. The methods discussed previously for the removal of unpolymerized material from polymerized methyl styrene fractions or solutions may be used for this purpose with excellent results.

If desired, the still residues may be subjected to additional treatment, such as by the application of elevated temperatures and/or catalysts, in order to polymerize all of the methyl styrene present prior to substituting a polymerizable solvent or solvents for the unpolymerized material present.

In addition to still residues, methyl styrene polymers derived from the polymerization of methyl styrene fractions or solutions under other conditions, such as the polymers obtained when such fractions or solutions are stored, shipped, or otherwise handled or treated, also may be used for the production of methyl styrene according to the methods described herein.

Methyl styrene polymers derived from any source, such as, for example, scrap or rejected methyl styrene polymers, including sprues, gates, flashing and miscellaneous scrap resulting from molding, casting, extruding, machining, and/or other handling, forming, and/or finishing operations, and off-grade or off-color methyl styrene polymers in general, may be used in the process disclosed herein.

In addition to the foregoing, copolymers and/or mixed polymers of methyl styrene with other polymerizable materials may be depolymerized according to the method disclosed herein. Thus, for example, copolymers and/or mixed polymers of one or more methyl styrenes with polymerizable compounds such as acrylic acid, derivatives and/or substituents of acrylic acid, methacrylic acid, derivatives and/or substituents of methacrylic acid, vinyl derivatives such as vinyl chloride and vinyl acetate, vinylidene derivatives, diolefines, olefines, and mixtures containing two or more of the foregoing, as well as copolymers and/or mixed polymers of methyl styrene with other polymerizable materials, may be used in the processes disclosed herein. The depolymerization of copolymers and/or mixed polymers of styrene and methyl styrene in the presence of a polymerizable solvent is more particularly described and claimed in my copending application Serial No. 430,717, filed February 13, 1942.

The depolymerized material thus obtained usually comprises a mixture of the added polymerizable solvent and methyl styrene, together with the other constituent or constituents of the copolymer and/or mixed polymers. Such mixture may be treated to recover one or more methyl styrenes by any suitable means, if desired, such as by fractional distillation, suitably under reduced pressure. In this way one or more monomeric methyl styrenes in good yields may be recovered, as well as good yields of the other monomeric compound or compounds which were present in the form of copolymer and/or mixed polymers. The monomeric component thus obtained from the copolymers and/or mixed polymers may be obtained in the form of mixtures or solutions with the polymerizable solvent or solvents employed in the depolymerization, and these mixtures may be used as such for any desired purpose, or where desired and when practicable they may be further treated by known methods, or otherwise in order to separate or partially separate the components thereof.

The solutions of methyl styrene polymers or resins, suitably dissolved in polymerizable solvents of the type described herein may be introduced into the depolymerizing units to be described presently in any desired form. As pointed out previously in discussing the polymerization of methyl styrene fractions or solutions, the polymers obtained may be in the form of high, medium or low-melting polymers or even liquid polymers. Low melting polymers are well adapted for use in the depolymerizing processes disclosed herein.

Thus, a mixture of polymerizable solvent and polymer may be melted by the application of heat. By the use of this method, relatively small quantities of polymerizable solvent and moderate temperatures may be employed in the production of a liquid mixture to be introduced into the depolymerizing unit. This may be advantageous in certain cases, particularly when it is desired to produce a mixture containing a low ratio of polymerizable solvent to methyl styrene.

However, I generally prefer to use polymer solutions which are liquid at room temperature, as such solutions may be handled with less difficulty than solutions containing less polymerizable solvent.

The deploymerization of the foregoing solutions of methyl styrene polymers may be carried out in the presence or absence of certain other diluents in the reaction zone, such as steam, saturated or non-polymerizable solvents, particularly relatively low boiling non-polymerizable solvents such as propane, butane, pentane, petroleum ether, benzene, and toluene, and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto, or otherwise.

In general, I prefer to carry out the depolymerization in the substantial absence of non-polymerizable solvents, except low boiling non-polymerizable solvents, such as, for example, propane, butane, pentane, or petroleum ether.

The depolymerizing operations may be carried out at atmospheric, sub-atmospheric, or super-atmospheric pressures. In general, atmospheric or sub-atmospheric pressures are preferred.

As the majority of the methyl styrene polymers are stable at temperatures below 300–350° C., temperatures above this range normally should be employed in order to obtain satisfactory yields of methyl styrene within a reasonable period of time. I have found that the use of temperatures above 400° C. and, particularly, above 500° C., are very satisfactory for the production of methyl styrene according to the methods described herein. Temperatures above 600° C. give excellent yields.

The desired solution of polymer in one or more polymerizable solvents may be charged to the reaction zone by any desired method. Thus, for example, the polymer solution may be pumped into the reaction zone, or it may be forced into the reaction zone by the application of pressure, or it may be drawn into the reaction zone by reducing the pressure therein, or otherwise. The container, pipe, tubes, valves, pumps, and other devices and equipment used to store the polymer solution prior to its delivery to the reaction zone, and to deliver it to the reaction zone at the desired rate, may be heated by any desired method to insure that the polymer is maintained at the desired temperature, if desired. This may be accomplished, among other ways, by providing such items of equipment with suitable jackets or coils through which steam or any other desired heating medium may be passed, or by the use of electrical resistance heaters for this purpose, or otherwise.

The polymer solution may be heated to any desired temperature prior to its introduction into the reaction zone, if desired. Thus, for example, it may be heated to an incipient decomposition temperature, or almost to this point, before being introduced into the reaction zone. In case a relatively low boiling solvent is present, the polymer-solvent mixture may be heated under a pressure sufficient to maintain the solvent in the liquid state at the chosen temperature prior to its introduction into the reaction zone.

An alternative method of introducing the polymer solution to the reaction zone comprises carbureting it with steam, a solvent or other liquid in the vapor state, an inert gas, or other suitable agent. This method is especially applicable to solutions of relatively low-melting polymers possessing an appreciable vapor pressure at temperatures below their initial depolymerizing temperature. Thus, for example, a solution of a liquid methyl styrene polymer in a polymerizable solvent may be heated to a tempreature of, say, 200° C. in a suitable vessel. A suitable carbureting medium such as, for example, superheated steam is passed through the heated liquid polymer solution, the mixture of steam and carburetted polymer solution then being delivered to the reaction zone. By a suitable control of the type of polymer solution employed, the temperature to which it has been heated, and the temperature of the steam employed for carbureting purposes, almost any desired ratio of steam and polymer solution may be delivered to the reaction zone.

Fairly high boiling polymerizable solvents, such as vinyl naphthalene, preferably should be employed for this purpose and/or the solvent present in the carburetor replenished from time to time. A relatively low melting type of polymer also is preferably employed. Otherwise, the polymerizable solvent may be removed completely from the carburetor before all of the methyl styrene polymer has been charged to the unit.

In the foregoing methods, the polymer solution may be delivered to the reaction zone in the form of a thin layer or stream, or in the form of a spray or mist of finely divided particles, depending upon other things, upon the type of fitting employed at the termination of the delivery pipe or other device in the reaction zone.

As pointed out previously, I have discovered that solutions of methyl styrene polymers in polymerizable solvents may be readily depolymerized to give good yields of monomeric methyl styrene, in the form of a mixture in a polymerizable solvent, by the application of heat to only a limited quantity of such polymer solutions at any given time. Any suitable procedure capable of meeting these conditions may be used for the depolymerization of solutions of methyl styrene polymers in polymerizable solvents.

Thus, for example, the polymer solution may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of monomeric methyl styrene in the form of a mixture with a polymerizable solvent, in good yields from solutions of methyl styrene polymers in polymerizable solvents by thermal depolymerization. In general, the clearance between the heated walls of such vessels and the agitator or scraper should preferably be less than ¼" and, more preferably, less than ⅛". Excellent results are obtained when the clearance between the two surfaces is 1/16" or less, and optimum results may be obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of methyl styrene by the thermal depolymerization of solutions of polymers thereof in polymerizable solvents.

In operation, the vessel is heated to the desired temperature, after which a solution of methyl styrene polymers in one or more polymerizable solvents, or a mixture of the polymer solution and one or more other agents, such as a saturated or non-polymerizable solvent, preferably one having a low boiling point, steam, and/or an inert gas, is introduced into the reaction vessel at any desired rate. The resin solution is distributed on the bottom and sides of the reactor by means of the agitator blade, the rate of flow of the resin solution and the depolymerizing temperature usually being so regulated that only a thin film of resin solution is present on the bottom and sides of the reaction vessel at any given period of time.

The reaction vessel may be opened at suitable intervals of time to remove any polymer residues, or other undesirable material, if desired. However, if proper precautions with respect to the type of polymer solution employed, the rate of addition of the polymer solution to the reaction vessel, the depolymerizing temperature, and the use of certain assisting agents are adhered to, very little, if any, undesirable decomposition products should collect in the reaction vessel.

As pointed out previously, the polymer solution may be carbureted by means of an inert gas, a non-polymerizable solvent, steam, or other desired agent prior to being introduced into the reaction zone.

Another suitable method for the depolymerization of methyl styrene polymers dissolved or dispersed in one or more polymerizable solvents comprises contacting such polymer solutions in a reaction vessel with a molten metal, alloy, salt, mixture of salts, or other liquids capable of withstanding relatively high temperatures without appreciable decomposition.

Molten lead or any other desired heating medium is maintained at the desired level in the reaction vessel while the polymer solution is charged to the unit by means of a suitable charging tube, the rate of flow of the polymer solution being controlled by means of a valve or other suitable device. The polymer solution may be delivered to the interior of the reaction vessel in any desired form, such as in the form of a thin stream, ribbon, or spray by the use of suitable constrictions or devices on the lower end of the charging tube. Likewise, the polymer solution may be delivered above or below the level of the molten heating material in the unit. The polymer solution may be delivered to the unit as such, or in combination with one or more assisting agents such as steam, non-polymerizing solvents, gases or the like.

During the operation of the unit, the molten metal or other material may be agitated to any desired extent, although such agitation is not necessary in all cases. The unit may be opened from time to time to remove any residual material present, or the molten metal may be removed, skimmed, and returned to the unit, either continuously, discontinuously, or otherwise. As a general rule, very little, if any, carbonaceous residues or other undesirable solid by-products are generated in the process due to the excellent contact between the heating medium and the material to be depolymerized.

An excellent method for the depolymerization of methyl styrene polymers dissolved in one or more polymerizable solvents comprises the application of heat thereto while in a very finely divided form. Any desired method of subdividing the polymer solution may be employed, such as pumping or forcing the polymer solution through a suitable nozzle, orifice, constriction, or fitting designed to subdivide the stream into a relatively large number of small, discrete particles. Other methods of accomplishing this purpose may, of course, be used if desired. Thus, for example, the polymer solution may be pumped, flowed, or otherwise delivered to the top of a suitable tower or vessel and permitted to flow over a perforated plate or screen, or both, or otherwise, in such manner as to disperse the material in the form of very thin streams, or drops, or otherwise.

Another suitable method of depolymerizing methyl styrene polymers dissolved or dispersed in one or more polymerizable solvents is to pump, blow or otherwise force such solutions through a tubular unit possessing a fairly narrow cross-sectional area, preferably while the polymer solution is in a finely divided or vaporized form, or otherwise. A pipe coil, tube bundle, or conventional cracking furnace may be used for this purpose with excellent results.

The polymer solution may be charged to a single coil furnace, either alone or in admixture or in combination with steam, a non-polymerizable solvent, a gas, or a mixture thereof, the preheating and depolymerizing processes being carried out in the same coil. An alternative method comprises preheating the polymer solution, or admixture, in one coil, then delivering such preheated material to a second coil in which the depolymerization is effected either alone or in the presence of steam, a non-polymerizable solvent, or a gas, or a mixture thereof, which mixture may be added to the polymer solution at the inlet, or within, the second coil.

Another method comprises heating the assisting agent, such as steam, a non-polymerizable solvent, a gas, or a mixture thereof, in one coil, then delivering such heated assisting agent or agents to the second coil in conjunction with a stream of polymer solution, or a mixture of the polymer solution and steam, a non-polymerizable solvent, and/or a gas.

Other methods familiar to those engaged in the pyrolysis of petroleum may be used if desired. Other types of furnaces also may be employed, such as the de Florez furnace, a tube coil immersed in a molten metal bath, and the like.

In addition, the polymer solution or admixture may be charged to a conventional gas set, or a modification thereof, such as those employed for the production of blue gas, oil gas, carburetted water gas, and the like.

Other methods based upon heating a stream of finely divided methyl styrene polymer solution, said solution comprising polymethylstyrene dissolved or dispersed in one or more polymerizable solvents, either alone or in conjunction with one or more assisting agents such as steam, another solvent, a gas, or a mixture thereof, may be used, if desired.

It is to be understood, also, that any combination of the foregoing depolymerizing methods may be used for the production of one or more methyl styrenes.

The method of condensing and cooling the depolymerized, and other, materials obtained also is important from the standpoint of obtaining good yields. The vapors preferably should be condensed and cooled as rapidly as possible in order to prevent any recombination and to prevent side reactions from occurring to any substantial degree. This may be accomplished by conducting the vapors into an efficient condenser and cooling as quickly as possible, a satisfactory condenser for this purpose being a water cooled shell and tube condenser. The depolymerized materials also may be shock-cooled if desired, such as by injecting a spray or stream of water or other cooling medium directly into the depolymerized products obtained from the reaction zone, or by passing the depolymerized products through a wash box filled wtih water, or otherwise.

In general, it may be said that the best results are obtained when a solution of the polymer in a polymerizable solvent is depolymerized in the form of thin films or small discrete particles or streams in the shortest possible period of time, then condensing and cooling the polymerizable solvent and depolymerized products in the shortest possible period of time. Any undue increase in the depolymerizing time, or the time required to condense and cool the polymerizable solvent and depolymerized materials, may be reflected in decreased yields and in the presence of substantial quantities of higher boiling oils and other undesirable by-products in the product obtained.

The steam, non-polymerizable solvents, gases, or mixtures thereof, which may be charged to the depolymerizing unit with the polymer solution assist in the reaction in many ways. They may serve to transmit heat directly to the polymer solution, to assist in sweeping out the products of the depolymerization from the reaction zone in the shortest possible period of time, and to serve as diluting agents, thus preventing, or reducing the rate of, the combination of the polymerizable materials present.

As pointed out previously, also, the steam, non-polymerizable solvent vapors, gases, or mixtures thereof used as assisting agents in the depolymerization of solutions of one or more methyl styrene polymers in polymerizable solvents may be preheated to any desired extent before being added to the polymer solution or introduced into the reaction zone, or otherwise, and such agent or agents, may be used as the sole source of heat, if desired.

By the use of the foregoing methods for the depolymerization of solutions of methyl styrene polymers in one or more polymerizable solvents, all of which are based upon the principle of exposing a limited quantity of the said solution to elevated temperatures for a limited period of time under conditions designed to effect a rapid transfer of heat from the heating surface or medium to the polymer solution, removing the polymerizable solvent and depolymerized materials from the heating zone, and condensing and cooling them as rapidly as possible, excellent yields may be obtained.

The depolymerization is preferably carried out in a relatively short period of time. The application of elevated temperatures to solutions of methyl styrene polymers in polymerizable solvents for prolonged periods of time, such as may be encountered, for example, in batch depolymerizing methods, may result in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone preferably rarely exceeds 10 minutes and, in most cases will not exceed 5 minutes. Contact times substantially under 5 minutes and, more particularly, under 1 minute, will be found to give excellent results.

By depolymerizing solutions of methyl styrene polymers in polymerizable solvents, or mixtures of such methyl styrene polymer solutions with other materials, according to the method described, particularly when units of the type illustrated are used for this purpose, excellent yields of methyl styrene, in the form of a mixture with one or more polymerizable solvents may be obtained. Higher boiling oils and/or other undesirable by-products obtained during the depolymerization are readily separable therefrom by distillation. Thus, for example, the depolymerization of methyl styrene polymers obtained from a light oil fraction boiling in the range of say, 165° to 175° C., in the form of a solution in one or more polymerizable solvents, will give yields of methyl styrene up to 70% by weight of the original polymer, or even higher, when such polymers are depolymerized according to my invention.

The product obtained from the depolymerization of solutions of methyl styrene polymers in one or more polymerizable solvents usually comprises a mixture of one or more monomeric methyl styrenes and the polymerizable solvent, or solvents, employed. Thus, when monomeric methyl styrene has been used to dissolve the methyl styrene polymers prior to the depolymerization thereof, the product obtained comprises one or more monomeric methyl styrenes. In case styrene has been employed as the solvent for the methyl styrene polymer prior to their depolymerization, the product obtained comprises a mixture of monomeric styrene and one or more monomeric methyl styrenes.

Quantities of higher boiling oils, such as the dimeric methyl styrenes, also may be present in the products obtained. Such higher boiling oils may be readily separated from the monomeric products, such as by distillation and/or fractionation operations, or otherwise.

In addition, when a mixture of two or more methyl styrene polymers, such as, for example, the methyl styrene polymers (including one or more homopolymers and/or one or more copolymers) obtained from a light oil methyl styrene fraction containing meta methyl styrene, para methyl styrene, and ortho methyl styrene, is depolymerized according to the method disclosed herein, the monomeric methyl styrenes present in the product obtained may be separated from each other, and from the polymerizable solvent, by any suitable method, such as, for example, by fractionation, suitably under reduced pressure and in the presence of a polymerization inhibitor.

In case monomeric methyl styrene has been used to dissolve the methyl styrene polymers prior to their depolymerization, the monomeric methyl styrene obtained may be used for the production of polymethylstyrene, or for other purposes.

In case other polymerizable solvents, such as styrene, have been employed for this purpose, the product will comprise a mixture of methyl styrene and such other polymerizable solvent or solvents, such as styrene. If desired, these may be separated by any desired method, such as, for example, by fractional distillation methods.

A preferred embodiment of this invention, however, is the preparation of co-polymers of the synthetic resin, synthetic rubber, or synthetic elastomer type, from the mixture of monomeric methyl styrene and other polymerizable solvents obtained from the process disclosed herein. Such copolymers may be prepared by the application of heat and/or catalysts to such mixtures, at atmospheric, sub-atmospheric, or superatmospheric pressures. Such copolymerizations also may be carried out in the emulsion state, if desired.

Thus, for example, when styrene has been employed as a solvent for the methyl styrene polymers prior to the depolymerization thereof, the resulting mixture of monomeric styrene and one or more monomeric methyl styrenes may be polymerized, such as by the application of heat, to give styrene-methyl styrene copolymers possessing excellent properties.

In a similar manner, copolymers of methyl styrene with one or more other polymerizable solvents, such as, for example, styrene, other substituted styrenes, olefins, substituted olefins, diolefins, substituted diolefines, acrylic acid, derivatives and/or substituents of acrylic acid, methacrylic acid, derivatives and/or substituents of methacrylic acid, vinyl derivatives, vinylidene derivatives, and the like, may be readily prepared by the use of such polymerizable solvents, or mixtures thereof, as solvents for methyl styrene polymers prior to the depolymerization thereof.

As pointed out previously, non-polymerizable solvents also may be added to the solution of methyl styrene polymers in a polymerizable solvent prior to or during the depolymerization thereof. In general, it may be said that such non-polymerizable solvents usually are removed from the mixture of methyl styrene and polymerizable solvent prior to the polymerization, or other use, thereof.

A suitable method for separating the mixture of monomeric methyl styrene and polymerizable solvent from the non-polymerizable solvent present in the depolymerized products comprises the fractional distillation of such material. As methyl styrene and the majority of the polymerizable solvents are readily polymerized by the application of heat, such fractional distillation preferably is carried out under reduced pressure and in the presence of inhibitors, such as hydroquinone. The use of continuous fractionating columns for this purpose is particularly desirable. As pointed out previously, the methyl styrenes, if more than one is present in the product, may be separated from each other in the same manner, or otherwise, if desired.

Due to the ease with which methyl styrene and certain of the polymerizable solvents may be polymerized by the application of heat, the use of non-polymerizable solvents having a boiling point substantially below that of the lowest boiling methyl styrene and/or the other polymerizable solvents present may result in a reduction of the quantity of polymers obtained during the fractionating operations. This is due to the fact that a fairly high reflux ratio may be employed in the early stages of the fractionation operations to effect a sharp separation between the non-polymerizable solvent and the methyl styrene and/or the polymerizable solvent present and, hence, at a fairly low operating temperature. After the non-polymerizable solvent has been substantially completely removed, the methyl styrene and the polymerizable solvent may be distilled at a relatively low reflux ratio, or without the use of any reflux to separate it from higher boiling by-products.

When a relatively high boiling non-polymerizable solvent has been employed in the process, a fairly high reflux ratio preferably is employed during the distillation of the methyl styrene and the polymerizable solvent in order to separate them from the higher boiling non-polymerizable solvent and higher boiling by-products present. Under these conditions, a considerable quantity of methyl styrene and/or polymerizable solvent may be converted to copolymers and/or mixed polymers.

In general, it may be said that non-polymerizable solvents having boiling points below 150° C., and more preferably below 50° C., are preferred in cases where the use of a mixture of non-polymerizable solvent and a polymerizable solvent for methyl styrene polymers before the depolymerization thereof is indicated.

It is to be understood that higher boiling oils obtained in the process may be separated from the methyl styrene in admixture with polymerizable solvent or solvents prior to the use thereof by any desired method, such as for example by fractional distillation under reduced pressure.

For the purpose of the claims, the term "substantially pure monomeric methyl ring substituted styrene" is intended to embrace one or more ring substituted methyl styrenes of at least 95% purity.

For the purpose of the specification and the claims the term "attenuated form" or its equivalent, unless otherwise modified, is intended to embrace sheet form, spray form, discrete particle form, small stream form, filament form, vapor form and similarly subdivided forms adapted for rapid heat transfer throughout the body of the material in process.

For the purpose of the specification and the claims, the term "methyl styrene fraction" is intended to include various polymerized forms thereof, such as the still residues obtained upon the distillation of such fractions.

The term "polymerizable solvent" is intended to embrace organic solvents containing at least one double bond and capable of being polymerized by the application of heat and/or catalysts. The monomeric methyl styrenes are intended to be included in such classification.

While specific procedures for the depolymerization of methyl styrene polymers in the form of solutions in one or more polymerizable solvents have been particularly described, as well as the units in which such depolymerization may be conducted, it is to be understood that these are by way of illustration. Therefore, changes, omissions, additions, substitutions, and/or modifications may be made within the scope of the claims without departing from the spirit of the invention.

I claim:

1. A process for depolymerizing ring substituted methyl styrene polymer comprising admixing said polymer with at least one added polymerizable solvent therefor containing at least one polymerizable double bond, and heating the resulting mixture of said ring substituted methyl styrene polymer and said added polymerizable solvent under temperature conditions at least as high as 350° C. for a period of time sufficient to effect depolymerization but insufficient to cause the formation of a substantial quantity of high boiling oil, thereby effecting the depolymerization of said ring substituted methyl styrene polymer under conditions of reduced concentration due to the presence of said added polymerizable solvent while recovering a product in which the concentration of polymerizable material is increased by the presence of said added polymerizable solvent above that due to the presence of monomeric material resulting from said depolymerization of said ring substituted methyl styrene polymer.

2. A process for depolymerizing ring substituted methyl styrene polymer comprising admixing said polymer with at least one added polymerizable solvent therefor containing at least one polymerizable double bond, and heating the mixture of said polymer and said added solvent in attenuated form under temperature conditions between 350° and 600° C. for a period of time sufficient to effect depolymerization but insufficient to cause the formation of a substantial quantity of high boiling oil, thereby effecting the depolymerization of said ring substituted methyl styrene polymer under conditions of reduced concentration due to the presence of said added polymerizable solvent while recovering a product in which the concentration of polymerizable material is increased by the presence of said added polymerizable solvent to a concentration higher than that which would result from the presence of monomeric material produced by said depolymerization.

3. A process for producing monomeric unsaturated material containing monomeric ring substituted methyl styrene and suitable for polymerization from a mixture of ring substituted methyl styrene and unpolymerizable material contaminated with methyl phenyl acetylene which comprises polymerizing said mixture, replacing unpolymerized material present with an added polymerizable solvent for the polymer containing at least one polymerizable double bond, heating the resulting solution under temperature conditions at least as high as 350° C. for a period of time sufficient to effect depolymerization but insufficient to cause the formation of a substantial quantity of high boiling oil, and recovering monomeric ring substituted methyl styrene in admixture with said added polymerizable solvent and substantially less contaminated with methyl phenyl acetylene.

4. A method for purifying ring substituted methyl styrene from methyl phenyl acetylene, said ring substituted methyl styrene being contained in a mixture with unpolymerizable material and contaminated with methyl phenyl acetylene which comprises polymerizing said mixture to produce a mixture of unpolymerized material and ring substituted methyl styrene polymer, replacing said unpolymerized material with an added polymerizable solvent for said ring substituted methyl styrene polymer containing at least one polymerizable double bond and containing at least one aromatic ring, heating the resulting solution in attenuated form under temperature conditions between 400° and 600° C. for a period of time sufficient to effect depolymerization but not exceeding five minutes, and recovering monomeric ring substituted methyl styrene produced by said depolmerization in admixture with said added polymerizable solvent and substantially less contaminated with methyl phenyl acetylene.

5. A method for purifying ring substituted methyl styrene from methyl phenyl acetylene, said methyl styrene being contained in a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added polymerizable solvent therefor containing a compound having the formula

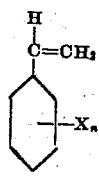

in which X represents an alkyl group and $n$ represents a number from 0 to 5, heating the resulting solution in attenuated form under temperature conditions between 400 and 600° C. for a period of time sufficient to effect depolymerization but not exceeding one minute, and recovering monomeric ring substituted methyl styrene produced by said depolymerization in admixture with said polymerizable solvent and substantially less contaminated with methyl phenyl acetylene.

6. A method for purifying ring substituted methyl styrene contained in a mixture with unpolymerizable material and contaminated with methyl phenyl acetylene which comprises polymerizing said mixture to produce a mixture of unpolymerized material and ring substituted methyl styrene polymer, replacing said unpolymerized material with an added solvent for said polymer containing monomeric ring substituted methyl styrene, heating the resulting solution of ring substituted methyl styrene polymer in added monomeric ring substituted methyl styrene in attenuated form under temperature conditions between 400 and 600° C. for a period of time sufficient to effect depolymerization but not exceeding five minutes, and recovering monomeric ring substituted methyl styrene produced by said depolymerization in admixture with said added monomeric ring substituted methyl styrene and substantially less contaminated with methyl phenyl acetylene.

7. A method for purifying ring substituted methyl styrene from methyl phenyl acetylene and for producing a mixture of monomeric styrene and monomeric ring substituted methyl styrene suitable for the production of styrene-ring substituted methyl styrene copolymer, said ring substituted methyl styrene being contained in a mixture with unpolymerizable material and contaminated with methyl phenyl acetylene which comprises polymerizing said mixture to produce a mixture of unpolymerized material and ring substituted methyl styrene polymer, replacing said unpolymerized material with an added solvent for said ring substituted methyl styrene polymer containing monomeric styrene, heating the resulting solution of ring substituted methyl styrene polymer in said solvent in attenuated form under temperature conditions between 400° C. and 600° C. for a period of time sufficient to effect depolymerization but not exceeding five minutes, and recovering monomeric ring substituted methyl styrene produced by said depolymerization in admixture with said added monomeric styrene and substantially less contaminated with methyl phenyl acetylene.

8. A method for purifying ring substituted methyl styrene contained in a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added polymerizable solvent for said ring substituted methyl styrene polymer containing monomeric ring substituted methyl styrene, heating the resulting solution of ring substituted methyl styrene polymer in added monomeric ring substituted methyl styrene in attenuated form under temperature conditions between 400 and 600° C. for a period of time sufficient to effect depolymerization but not exceeding five minutes, and recovering monomeric ring substituted methyl styrene produced by said depolymerization in admixture with said added monomeric ring substituted methyl styrene and substantially less contaminated with methyl phenyl acetylene.

9. A method for purifying ring substituted methyl styrene from methyl phenyl acetylene and for producing a mixture of monomeric styrene and monomeric ring-substituted methyl styrene suitable for the production of styrene-ring-substituted methyl styrene copolymer, said ring substituted methyl styrene being contained in a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added solvent for said ring substituted methyl styrene polymer containing monomeric styrene, heating the resulting solution of ring substituted methyl styrene polymer in said solvent in attenuated form under temperature conditions between 400° C. and 600° C. for a period of time sufficient to effect depolymerization but not exceeding five minutes, and recovering monomeric ring substituted methyl styrene in admixture with said added monomeric styrene and substantially less contaminated with methyl phenyl acetylene.

10. A method for purifying ring substituted methyl styrene from methyl phenyl acetylene and for producing a mixture of monomeric ring substituted methyl styrene and monomeric diolefinic material suitable for the production of ring substituted methyl styrene-diolefine copolymer from a mixture of ring substituted methyl styrene with unpolymerizable material contaminated with methyl phenyl acetylene which comprises polymerizing said mixture to produce a mixture of unpolymerized material and ring substituted methyl styrene polymer, replacing said unpolymerized material with an added polymerizable solvent for said ring substituted methyl styrene polymer containing monomeric diolefinic material, heating the resulting solution in attenuated form under temperature conditions between 400 and 600° C. for a period of time sufficient to effect depolymerization but not exceeding five minutes, and recovering monomeric ring substituted methyl styrene resulting from said depolymerization in admixture with said added monomeric diolefinic material and substantially less contaminated with methyl phenyl acetylene.

11. A method for purifying ring substituted methyl styrene from methyl phenyl acetylene and for producing a mixture of monomeric ring substituted methyl styrene and monomeric butadiene suitable for the production of ring substituted methyl styrene-butadiene copolymer from a mixture of ring substituted methyl styrene with unpolymerizable material contaminated with methyl phenyl acetylene which comprises polymerizing said mixture to produce a mixture of unpolymerized material and ring substituted methyl styrene polymer, replacing said unpolymerized material with an added polymerizable solvent for said ring substituted methyl styrene polymer containing monomeric butadiene, heating the resulting mixture in attenuated form under temperature conditions between 400 and 600° C. for a period of time sufficient to effect depolymerization but not exceeding five minutes, and recovering monomeric ring substituted methyl styrene resulting from said depolymerization in admixture with said added monomeric butadiene and substantially less contaminated with methyl phenyl acetylene.

12. A method for purifying ring substituted methyl styrene from methyl phenyl acetylene and for producing a mixture of monomeric ring substituted methyl styrene and monomeric butadiene suitable for the production of ring substituted methyl styrene-butadiene copolymer from a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added polymerizable solvent for said ring substituted methyl styrene polymer containing monomeric butadiene, heating the resulting solution in attenuated form under temperature conditions between 400 and 600° C. for a period of time sufficient to effect depolymerization but not exceeding five minutes, and recovering monomeric ring substituted methyl styrene resulting from said depolymerization in admixture with said added monomeric butadiene and substantially less contaminated with methyl phenyl acetylene.

13. A method for purifying ring substituted methyl styrene contained in a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added polymerizable solvent for said ring substituted methyl styrene polymer containing monomeric ring substituted methyl styrene, heating the resulting solution of ring substituted methyl styrene polymer in added monomeric ring substituted methyl styrene in attenuated form under temperature conditions between 400 and 600° C. for a period of time sufficient to effect depolymerization but not exceeding one minute, and recovering monomeric ring substituted methyl styrene produced by said depolymerization in admixture with said added monomeric ring substituted methyl styrene and substantially less contaminated with methyl phenyl acetylene.

14. A method for purifying ring substituted methyl styrene from methyl phenyl acetylene and for producing a mixture of monomeric styrene and monomeric ring-substituted methyl styrene suitable for the production of styrene-ring-substituted methyl styrene copolymer, said ring substituted methyl styrene being contained in a light oil ring substituted methyl styrene fraction contaminated with methyl phenyl acetylene which comprises polymerizing said fraction to produce a mixture of unpolymerized material and ring substituted methyl styrene polymer, replacing said unpolymerized material with an added solvent for said ring substituted methyl styrene polymer containing monomeric styrene, heating the resulting solution of ring substituted methyl styrene polymer in said solvent in attenuated form under temperature conditions between 400 and 600° C. for a period of time sufficient to effect depolymerization but not exceeding one minute, and recovering monomeric ring substituted methyl styrene in admixture with said added monomeric styrene and substantially less contaminated with methyl phenyl acetylene.

15. A method for purifying ring substituted methyl styrene from methyl phenyl acetylene and for producing a mixture of monomeric ring substituted methyl styrene and monomeric butadiene suitable for the production of ring substituted methyl styrene-butadiene copolymer from a light oil ring substituted methyl styrene fraction contaminated with methyl phenyl acetylene with comprises polymerizing said fraction to produce a mixture of unpolymerized material and ring substituted methyl styrene polymer, replacing said unpolymerized material with an added polymerizable solvent for said ring substituted methyl styrene polymer containing monomeric butadiene, heating the resulting solution in attenuated form under temperature conditions between 400 and 600° C. for a period of time sufficient to effect depolymerization but not exceeding one minute, and recovering monomeric ring substituted methyl styrene resulting from said depolymerization in admixture with said added monomeric butadiene and substantially less contaminated with methyl phenyl acetylene.

16. A method for purifying ring substituted methyl styrene contained in a light oil ring substituted methyl styrene fraction contaminated with methyl phenyl acetylene which comprises polymerizing said fraction to obtain a mixture of unpolymerized material and ring substituted methyl styrene polymer, replacing said unpolymerized material with added monomeric ring substituted methyl styrene and dissolving said ring substituted methyl styrene polymer therein, heating the resulting solution of ring substituted methyl styrene polymer in said added monomeric ring substituted methyl styrene in attenuated form under temperature conditions between 400 and 600° C. for a period of time sufficient to effect depolymerization but not exceeding one minute, and recovering substantially pure monomeric ring substituted methyl styrene comprised of monomeric ring substituted methyl styrene resulting from said depolymerization and said added monomeric ring substituted methyl styrene.

FRANK J. SODAY.